(12) United States Patent
Kaufman et al.

(10) Patent No.: US 9,391,808 B2
(45) Date of Patent: Jul. 12, 2016

(54) PHONECASTING SYSTEMS AND METHODS

(76) Inventors: Matthew Kaufman, Bonny Doon, CA (US); Michael Sharp, Porter, TX (US); Christopher Coleman, Niota, IL (US)

( * ) Notice: Subject to any disclaimer, the term of this patent is extended or adjusted under 35 U.S.C. 154(b) by 1055 days.

(21) Appl. No.: 11/877,612

(22) Filed: Oct. 23, 2007

(65) Prior Publication Data

US 2008/0107102 A1    May 8, 2008

Related U.S. Application Data

(60) Provisional application No. 60/862,755, filed on Oct. 24, 2006.

(51) Int. Cl.
*H04L 12/66* (2006.01)

(52) U.S. Cl.
CPC .......................... *H04L 12/66* (2013.01)

(58) Field of Classification Search
CPC .................................................. H04W 68/08
USPC ........ 715/251; 379/88.17; 370/335, 462, 352; 725/37; 705/1; 709/231
See application file for complete search history.

(56) References Cited

U.S. PATENT DOCUMENTS

| | | | | |
|---|---|---|---|---|
| 4,553,234 A | * | 11/1985 | Brandsma et al. | 370/458 |
| 6,052,377 A | * | 4/2000 | Ohmi et al. | 370/437 |
| 6,144,375 A | * | 11/2000 | Jain et al. | 715/251 |
| 6,359,980 B1 | * | 3/2002 | Petrelli et al. | 379/221.13 |
| 6,411,693 B1 | * | 6/2002 | McKeeth | 379/130 |
| 6,539,087 B1 | * | 3/2003 | Walsh et al. | 379/202.01 |
| 6,611,831 B1 | * | 8/2003 | Dunn et al. | 379/220.01 |
| 7,054,654 B1 | * | 5/2006 | Sladek et al. | 455/466 |
| 7,425,980 B1 | * | 9/2008 | Harris | 348/14.08 |
| 7,729,687 B2 | * | 6/2010 | Nguyen et al. | 455/415 |
| 7,746,990 B1 | * | 6/2010 | Fabbrizio et al. | 379/114.13 |
| 2002/0097708 A1 | * | 7/2002 | Deng | 370/352 |
| 2002/0107049 A1 | * | 8/2002 | Maquaire et al. | 455/563 |
| 2003/0103607 A1 | * | 6/2003 | Feakes | 379/88.17 |
| 2005/0114711 A1 | * | 5/2005 | Hesselink et al. | 713/201 |
| 2006/0165040 A1 | * | 7/2006 | Rathod et al. | 370/335 |
| 2006/0174266 A1 | * | 8/2006 | Gatto et al. | 725/37 |
| 2006/0190616 A1 | * | 8/2006 | Mayerhofer et al. | 709/231 |
| 2007/0060109 A1 | * | 3/2007 | Ramer et al. | 455/414.1 |
| 2007/0077921 A1 | * | 4/2007 | Hayashi et al. | 455/414.1 |
| 2007/0097929 A1 | * | 5/2007 | Dunko et al. | 370/338 |

(Continued)

OTHER PUBLICATIONS

Jim Van Meggelen, et al., Asterisk, The Future of Telephony, O'Reilly Network, pp. i-358, Aug. 31, 2005.

(Continued)

*Primary Examiner* — Parth Patel
(74) *Attorney, Agent, or Firm* — Klarquist Sparkman, LLP

(57) ABSTRACT

Multimedia files, such as audio programming, are currently available to Internet users through a combination of their personal computer, an optional portable digital audio player, and an Internet connection. Many audio programs are now currently distributed over the Internet in a syndicated form known as a "podcast", allowing users to access the latest version or "episode" of the program. The disclosed systems and methods provide a convenient, publicly-accessible system for allocating and using dedicated phone numbers to enable access to these programs. A person can simply place a telephone call and listen to such syndicated or otherwise distributed audio programming through the telephone network without the use of a computer or portable digital audio player.

17 Claims, 7 Drawing Sheets

(56) References Cited

U.S. PATENT DOCUMENTS

2007/0100651 A1* 5/2007 Ramer et al. .................. 705/1
2007/0116036 A1* 5/2007 Moore ......................... 370/462
2007/0238453 A1* 10/2007 Chang .......................... 455/421
2007/0294096 A1* 12/2007 Randall et al. ................ 705/1
2009/0279538 A1* 11/2009 Merino Gonzalez et al. 370/352

OTHER PUBLICATIONS

DEMO—A Short History of DEMO, DEMO Mediaroom website, http://demo.mediaroom.com/index.php?s=56.

Listen to Podcasts on Any Phone, Nov. 12, 2006, pp. 1-16, http://www.techcruch.com/2006/11/12/listen-to-podcasts-on-any-phone/.

* cited by examiner

PHONECASTING SYSTEMS AND METHODS

CROSS-REFERENCE TO RELATED APPLICATIONS

The present application claims priority to Provisional U.S. Patent Application 60/862,755, entitled "Method Allowing Telephone Callers To Hear Multimedia Files Syndicated On Or Otherwise Distributed Via The Internet" and filed Oct. 24, 2006, by inventor Matthew Kaufman.

BACKGROUND

With the development of Apple Inc.'s iPod®, portable players for digital media entered the mainstream. Such portable media players routinely provide compact storage and playback of thousands of songs, and recent models include capabilities for storing and playing videos as well. The widespread availability of such devices created a platform for a new method of communication: podcasting. The term "podcast" is a combination of the words "iPod" and "broadcast", and it in essence refers to the ability to syndicate an audible program to subscribers' portable media players.

The podcasting process begins with a content provider publishing an audio file on the Internet. The content provider then references that audio file in a syndication file, which in addition to the uniform resource locator (URL) of the audio file, typically includes additional information such as title, description, publication date, etc., of the audio program along with similar information for previous episodes of the program. The syndication file is commonly in a Really Simple Syndication (RSS) format, though other standard formats are also suitable. The syndication file has a fixed URL so that software on subscribers' computers can periodically check for new material. When new material is detected, the software typically downloads the newest audio file automatically so that it can be easily transferred to the portable media players the next time a synchronization is performed. In this manner, owners of media players are theoretically able to maintain dynamic and current content on their media players for "on the go" listening.

Podcasting has achieved widespread success. However, the podcasting process may have a number of shortcomings that have not been adequately identified and addressed heretofore. For example, podcast subscribers are required to have some amount of foresight regarding their listening preferences when subscribing and, moreover, must remember to charge, synchronize, and bring their portable media players (and headphones) with them for every circumstance in which they might wish to listen to their preferred podcast content. Often, some oversight in the subscribing, downloading, charging, synchronization, and custody process will leave a user without any ability to listen to the latest podcast material.

As another example, the podcast process typically imposes a significant degree of latency between the publication of the material and the subscriber's listening experience. For some subscribers, this latency is undesirable. It is perhaps unsurprising that, according to a consumer survey reported by TDG (The Diffusion Group) Research, the vast majority of downloaded podcasts are never transferred to a portable media player, but rather are played directly on networked computers.

BRIEF DESCRIPTION OF THE DRAWINGS

A better understanding of the various disclosed embodiments can be obtained when the detailed description is considered in conjunction with the following drawings, in which.

Figure 1:
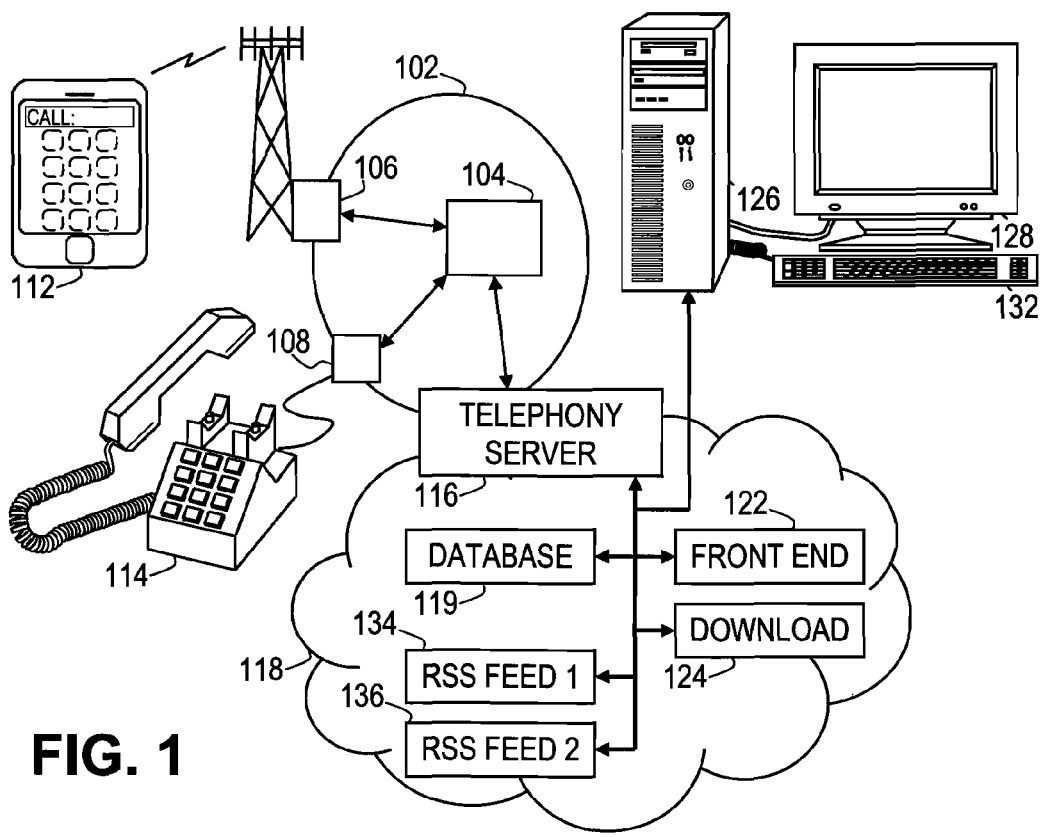
FIG. 1 is an environmental view of an illustrative phonecasting system.

While the disclosed inventions are susceptible to various modifications and alternative forms, specific embodiments thereof are shown by way of example in the drawings and will herein be described in detail. It should be understood, however, that the drawings and detailed description thereto are not intended to limit the inventions to the particular form disclosed, but on the contrary, the intention is to cover all modifications, equivalents and alternatives falling within the spirit and scope of the inventions as defined by the appended claims.

TERMINOLOGY

The term "feed" as used herein refers to a program, presentation, or other content made available for transmission or conveyance via the Internet. A feed can exist in various forms, including a podcast, a song or other fixed sound file, a periodically updated sound file, and a live media stream.

The term "phonecast," when used herein as a noun, refers to a feed that can be accessed with a phone over the public switched telephone network (PSTN) and/or over a voice over internet protocol (VoIP) channel. When used herein as a verb, the term "phonecast" refers to the transmission or conveyance of a feed over a VoIP or PSTN channel to a phone.

The term "includes" as used herein is an open-ended term, as in "including, but not limited to".

DETAILED DESCRIPTION

To at least partly address some of the above-identified shortcomings of the podcasting process, the present application discloses a number of inventive phonecasting system and method embodiments. At least some of the method embodiments provide a publicly-accessible web page having a field for identifying a feed having an audible component. In response to the feed identifier, these method embodiments further provide a web page that displays at least one phone number for listening to that feed. The feed can take any of a number of forms, including a podcast, a song or other fixed sound file, a periodically updated sound file, and a live media stream publicly-accessible via the Internet. As part of displaying the phone number, the method may include consulting a database to determine if a phone number has been previously assigned to the feed, and assigning a new phone number to the feed if not. In some method embodiments, the web page may include a field for users to request a specific area code for the feed phone number.

At least some phonecasting system embodiments include a network server having a memory and at least one processor coupled to the memory to execute front end software stored therein. The front end software configures the processor to receive an identifier of a feed having an audible component, and further configures the processor to responsively provide at least one phone number for listening to the feed. If the phone number is called by a videophone, some system embodiments will also display the video component of the feed, if any exists. The feed identifier may be a uniform resource locator (URL) of a podcast syndication file or some other form of unique identification.

In some phonecasting method and system embodiments, a call to a number associated with a publicly-accessible Internet feed is answered by an introductory message that precedes the playback of the publicly-accessible Internet feed. The introductory message may be an advertisement that is chosen based on the feed and/or based on the caller id information. Various ones of the phonecasting method and system embodiments may further include processes and components for eliminating redundant or largely-unused phone numbers from the database so that such numbers can be freed up for other feeds. Moreover, some phonecasting method and system embodiments enable recording of content and/or advertisements via phone for simplified podcasting and phonecasting.

At least some of the foregoing phonecasting methods and systems enable free public access to Internet content via any phone, thereby eliminating or mitigating many of the shortcomings of the podcasting process. Users need only obtain the phone numbers for their preferred podcasts (or other Internet content) to be able to access the latest content from any phone. Phone number sharing and publication will also make such content instantly available to new users as well.

FIG. 1 shows an illustrative phonecasting system in context. The public switched telephone network (PSTN) 102 includes a hierarchy of switches 104, 106, 108, and communication links that interconnect customer provided equipment (CPE) such as cell phones 112, "land-line" phones 114, and modems. A telephony server 116 couples to the PSTN 102 to initiate and receive phone calls. Often (though not necessarily) the telephony server 116 connects to the PSTN 102 via a trunk line that supports multiple simultaneous calls.

The telephony server 116 also couples to the Internet 118 to optionally send and receive streams of audio data. Alternatively, sound files can be played and recorded internally by telephony server 116. Telephony server 116 may be an Asterisk™ server (or a farm of such servers), the setup and operation of which is described in detail in J. Van Meggelen, J. Smith, and L. Madsen, *Asterisk: The Future of Telephony*, © 2005 O'Reilly Media, Inc., Farnham.

Together with the telephony server 116, the illustrative phonecasting system includes a database server 119, a front end server 122, and a download server 124. The telephony server 116 relies on the database server 119 to determine the audio program and introductory message that corresponds to the dialed phone numbers of incoming calls. With the links provided by the database server 119, the telephony server 116 initiates streaming of the appropriate files from the download server 124. The front end server 122 provides a web site that serves as a phonecasting system interface for Internet users. Internet users typically will run web browser software on their computers 126. The web browser software displays a web page on their monitor 128, with one or more fields for the user to populate via an input device 132.

Among other things, Internet users will be able to enter Internet feed identifiers for, e.g., RSS (really simple syndication) feeds 134, 136. The front end server 122 accesses the database server 119 to determine whether phone numbers have previously been assigned, and if not, the front end server retrieves an available phone number from the database and assigns it to the feed. If the phone number is newly assigned, the front end server 122 also notifies the download server 124 to initiate retrieval and translation of the feed. Once a phone number has been assigned, the front end server 122 generates a web page for display on the user's computer monitor 128, showing the assigned phone number.

Figure 2:
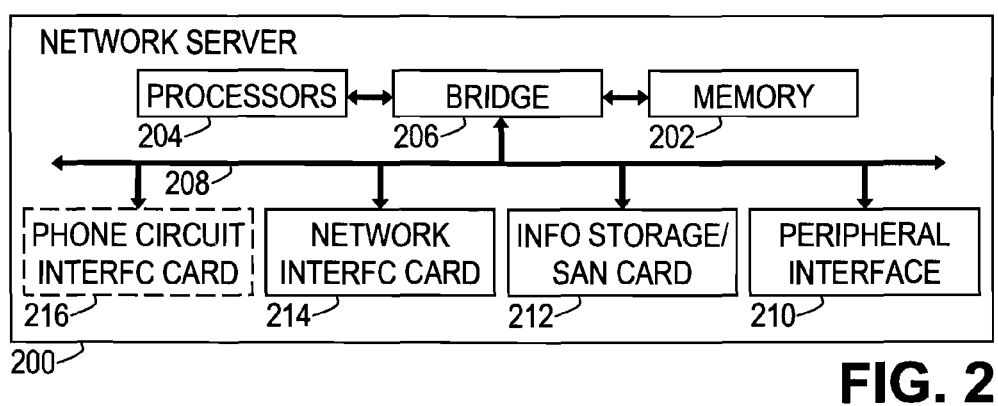
FIG. 2 is a functional block diagram of an illustrative phonecasting system server.

Though the illustrative system is shown as including four servers having separate functions, these functions can be consolidated and/or distributed as needed to provide the appropriate server capacity. FIG. 2 is a functional block diagram of an illustrative phonecasting system server 200, which may serve a portion or some combination of the functions outlined previously. The server 200 includes a memory 202, one or more processors 204, and a high-speed bridge that connects the processor(s) 204 with the memory 202 and the expansion bus 208. The expansion bus 208 supports communication with a peripheral interface 210, information storage device 212, network interface card 214, and an optional phone circuit interface card 216.

Peripheral interface 210 provides ports for communicating with external devices such as keyboard, mice, universal serial bus (USB) devices, printers, cameras, speakers, etc. On many servers, these ports may be left largely unused, but they are available for configuration, diagnostic, performance monitoring purposes. Information storage device 212 is typically a nonvolatile memory for firmware and/or a hard drive for extended storage of software and data. On distributed systems with high data availability requirements, the information storage device 212 is replaced or supplemented with a storage area network (SAN) card that enables shared access to a large disk array. A network interface card 214 provides access to other network servers and usually to the Internet as a whole. Finally, in the telephony server, an interface card for the telephone circuits is optionally included. In some alternative embodiments, the connection to the PSTN is accomplished indirectly via Voice over Internet Protocol (VoIP) techniques, eliminating the need for dedicated telephone circuit interface hardware.

Before the illustrative server 200 boots, the relevant phonecasting software components are stored on the local hard drive 212, or sometimes on a network disk accessible via the network interface card. After the initial boot-up diagnostics are completed, the processor(s) loads the phonecasting software components into memory, either all at once or on an "as needed" basis (e.g., by paging the needed instructions into memory). As the processor(s) execute the software instructions, the software configures the operation of the illustrative server(s) in accordance with the methods and principles set forth herein.

Figure 3:
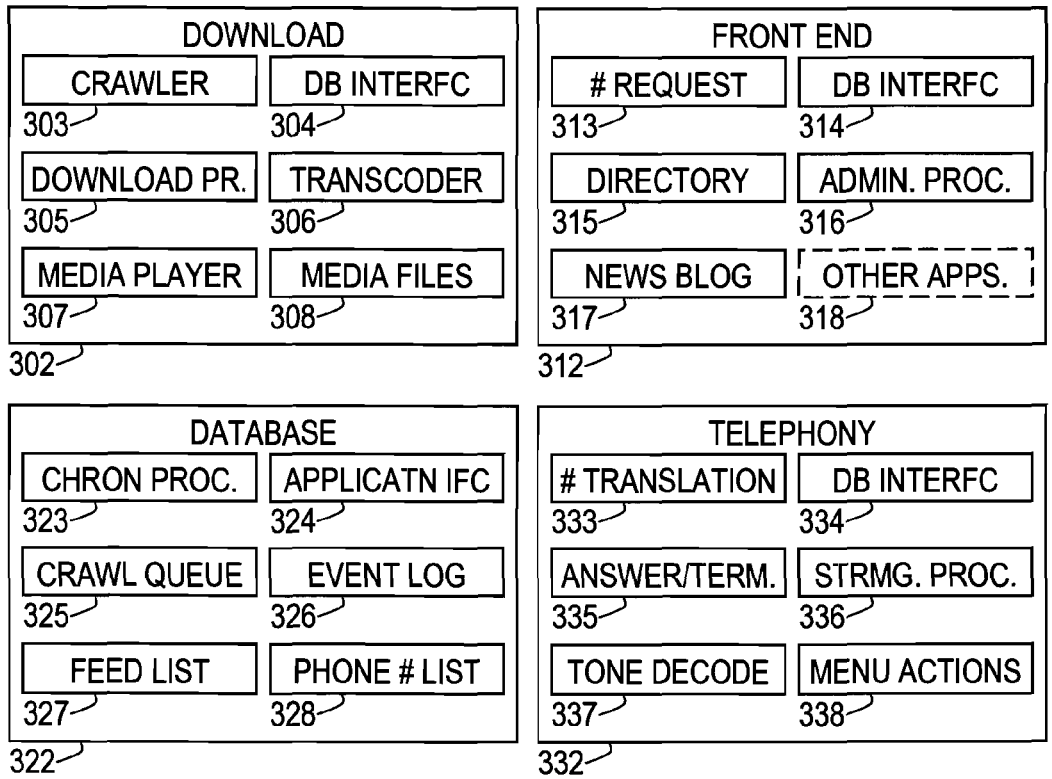
FIG. 3 is a function block diagram of illustrative phonecasting system software.

FIG. 3 is a function block diagram of illustrative phonecasting system software. Though numerous independently executing processes exist, they can be grouped into four functional groups that correspond with the four servers of the illustrative phonecasting system: the telephony server, the database server, the front end server, and the download server. These will be addressed in reverse order, and initially at a high level. Thereafter, a more detailed discussion will be provided regarding a number of the more pertinent methods carried out by the phonecasting system.

The illustrative download software 302 performs an automated downloading and translation function to make Internet multimedia files locally available, and it optionally streams the multimedia files on demand. The illustrative download software 302 includes a crawler 303, a database interface 304, a download process 305, a translation process 306, a streaming media player 307, and a media file storage hierarchy 308. The database interface process 304 establishes a connection to the database software 322 to assure coherent and reliable database access for the other download processes. Via the interface 304, the crawler 303 periodically retrieves a list of feeds that need to be checked for updates. The list includes information regarding the last download of the feeds, such as episode number, title, file size, and publication date. The crawler then checks the feeds on the Internet for updates or changes relative to the last download. If an update or other change is detected, the crawler 303 notifies the download process 305 to retrieve the latest version of the relevant sound or multimedia file. The illustrative download process 305 is designed to conduct multiple downloads with redundancy and tolerance for errors or temporary outages.

As the download process 305 completes the retrieval of each multimedia or sound file, the illustrative translation process 306 converts the audio component of the file into a format suitable for playback over a telephone connection. For example, MP3 files may be converted to uncompressed audio, re-sampled to 8 kHz monaural, and companded using a μ-law companding algorithm. In this format, the media player 307 can (upon demand) stream the file to a telephone connection with minimal processing. As the translation process 306 completes, the files are stored in a file hierarchy 308 with any given standard naming convention, and the translation process 306 notifies the database of a successful download.

The illustrative front end software 312 provides a web interface to the phonecasting system. It includes a request component 313, a database interface process 314, a directory component 315, an administrative component 316, a news blog 317, and other optional applications 318. As before, the database interface process 314 establishes a connection to the database software 322 to assure coherent and reliable database access for the other front end processes. The request component 313, the directory component 315, the administrative component 316, and the news blog 317 may each take the form of web pages having fields for receiving user input and software modules for appropriately processing the user input. The illustrative request component 313, for example, includes a field for specifying a feed identifier, which if filled, causes the request component to obtain and display a phone number for that feed. The illustrative request component 313 first accesses the database to determine if a phone number has been previously assigned, and if not, the request component 313 requests that an available phone number from the database be assigned to the feed.

The illustrative directory component 315 enables keyword searching of the titles and identifiers for feeds having assigned phone numbers. The illustrative administrative component 316 enables an administrator to log in and monitor system operations. The administrator can further adjust usage thresholds for recycling relatively unused numbers (e.g., 60 days without a call), may add new blocks of phone numbers to the system, remove redundant numbers to a given feed, add additional numbers (or area codes) to heavily used feeds, and perform system backups. The news blog component 317 allows an administrator to publish the latest news and events for user convenience. Finally, the illustrative front end 312 includes other applications such as feed publishing utilities, podcast hosting services, and advertiser bidding utilities.

The illustrative database software 322 includes a chronology process 323, an application interface process 324, a crawl queue 325, an event log 326, a feed list 327, and a phone number list 328. The chronology process 323 periodically reviews the database tables for certain occurrences, such as the elapsing of a specified interval since the last time a feed was checked for an update, or the number of available numbers falling below a threshold. When such occurrences are detected, the chronology process 323 performs a specified action. In the case of a feed not being recently checked for an update, the chronology process 323 places the feed identifier in the crawl queue, where it will be seen the next time the crawl process 303 checks. In the case of too few available phone numbers, the chronology process 323 may send a message to a designated email address and/or initiate the execution of a phone number recycling process.

The application interface process 324 cooperates with the database interface processes 304, 314, and 334 to establish database connections with the other server software. Crawl queue 325 is a database table containing a list of feed identifiers that need to be checked for updates. Event log 326 is a table for tracking database transactions. Feed list 327 is a table containing a list of all the feeds with their assigned phone numbers. Phone number list 328 is a table containing a list of all the available (unassigned) phone numbers.

The illustrative telephony software 332 performs automated call completion, connecting telephone channels to the Internet feed associated with the dialed number. Illustrative software 332 includes a number translation module 333, a database interface process 334, a call answer/termination module 335, a streaming module 336, a tone decoding module 337, and a menu module 338. The number translation module 333 accesses the database to determine the feed or sound file and introductory message currently associated with the dialed phone number, and having determined them, passes the information to the call answer/termination module 335. Module 335 answers the call and monitors the connection while streaming module 336 coordinates with media player 307 to initiate playback of the introductory message and the sound file. If module 335 detects tone activity (e.g., from a caller pressing buttons on the keypad), the tone decode process 337 is invoked to determine which keys have been pressed. With the key presses determined module 335 can invoke the appropriate menu module 338. The menu module 338 generates the appropriate action, e.g., pausing, skipping forward or backward in the playback, switching to a previous/subsequent episode, playing a menu of other options, subscribing a user for future notifications, initiating a purchase of an advertised item, and so on.

Figure 4:
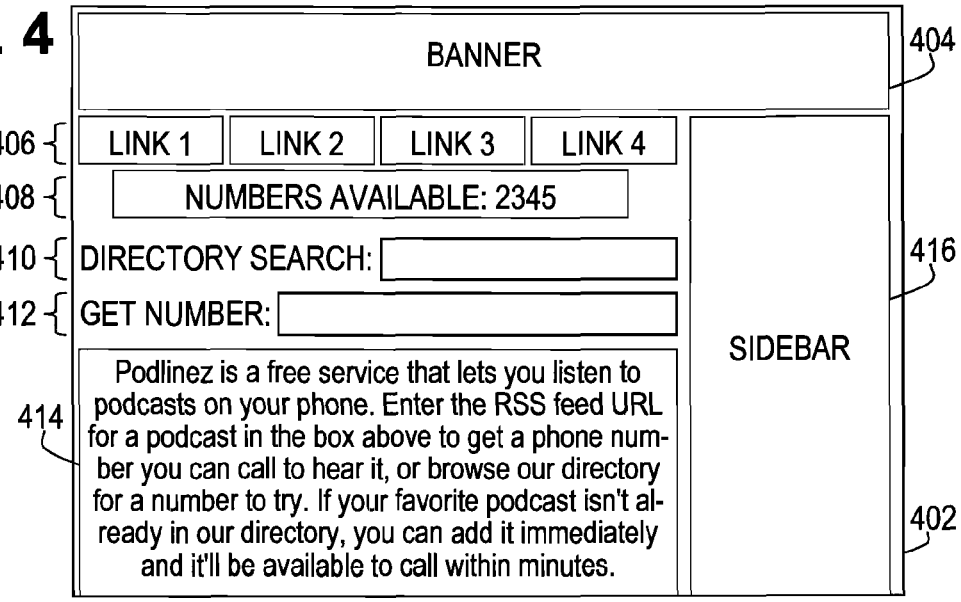
FIG. 4 shows an illustrative front end web page.

FIG. 4 shows an illustrative front end web page 402 as it may be displayed to a public user by request component 333. Web page 402 includes a banner 404 identifying and branding the phonecasting service. A number of links 406 are provided for navigating the site, e.g., to access support or other services. A status box 408 specifies the number of currently unassigned phone numbers, which consequently are available to be assigned to an Internet feed. A labeled directory field 410 enables a user to enter keywords to search a directory of feeds already having assigned phone numbers. If a user presses "Enter" after having made an entry in this field, that user will be presented with a list of phone numbers and corresponding feed titles that match the keywords.

A labeled request field 412 enables a user to enter a uniform resource locator (URL) for a publicly-accessible feed. Upon pressing "Enter", the user will be presented with at least one phone number that has been assigned to that feed. In some cases, a feed may have multiple phone numbers associated with it, e.g., numbers in different area codes. The web page 402 further includes a description 414 explaining how the phonecasting service works. A sidebar 416 is also provided to, e.g., display lists of most popular feeds and most recently accessed feeds.

Figure 5:
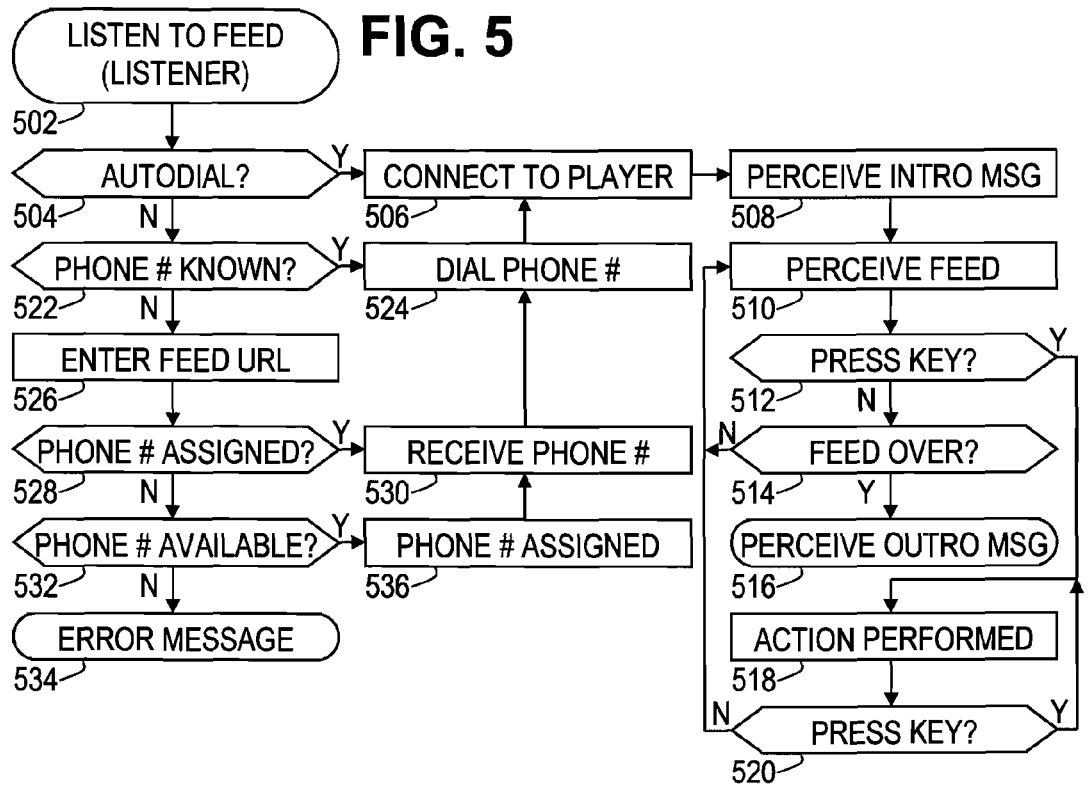
FIG. 5 is a flowchart of an illustrative phonecast listening method.

FIG. 5 is a flowchart of an illustrative phonecast listening method 502. Beginning in block 504, a user chooses whether or not to autodial a phonecast number. The autodial feature can be made available in a number of ways. One autodial method involves programming a speed dial or voice-recognition system to dial the phonecast number on demand. Another autodial method involves scanning a barcode or RFID (radio frequency identification) tag that provides (directly or indirectly) a phone number to a mobile phone. Yet another autodial method involves a "click to call" link embedded in a webpage, email, or SMS (short message service) message that invokes the computer or phone's autodialing function. These and other autodial methods enable a user to easily command a phone to call a phonecast number, so that the phone connects to a phonecast player in block 506.

In block 508, the listener hears (audio) or sees (video) an introductory message. The introductory message may be a simple welcoming message, a general advertisement, or a targeted advertisement selected on the basis of the caller ID information and/or the content of the feed. Though the introductory message can be limited to 10 or 15 seconds, other introductory message lengths are possible and may be desirable. In some system embodiments, the listener is unable to use pause or skip functionality during the introductory message.

Once the introductory message terminates, the listener hears (audio) or views (video) the feed in block 510. In block 512 the listener can provide user input, e.g., in the form of a key press or voice command, until the feed terminates in block 514. (Once the feed ends, the listener hears or sees an "out-ro" or closing message as the call terminates in block 516.) If the user provides user input in block 512, the system optionally pauses the feed to perform the action that is triggered by the user input in block 518. Absent further user input in block 520, the phonecast resumes in block 510.

A number of actions may be made available to the user in blocks 512, 518, and 520. Such actions include pausing the feed, skipping ahead, and skipping backward. Another possible action may be subscribing for instant notification of future updates to the material, in which case the system may capture caller identification (CID) or automatic number identification (ANI) information to enable voice mail or SMS message notifications to be sent. Another possible action may be initiating a purchase of some product or service discussed in the feed. Again, the system would capture the CID or ANI information and arrange to have the user's phone service provider provide delivery information and send a bill for the product or service.

Returning to block 504, if the autodialing option is not available, the user determines if he knows the phonecast phone number in block 522. The number may be known if the user has previously stored or memorized the number, or if it if being provided by an advertisement or by a friend. If the number is known, the user can dial the number in block 524 and the method proceeds as before.

If the number is not known block 522, the user accesses the front end software in block 526 and enters a feed identifier into a phone number request field. In block 528, the system determines if a phone number has been previously assigned, and if so, the user receives the phone number in block 530. If no number is currently assigned, the system determines in block 532 whether any unassigned phone numbers are available, and if so, the system assigns a phone number in block 536. Otherwise, an error message is presented in block 534, and a notification is sent to the administrator so that the situation can be rectified.

Figure 6:
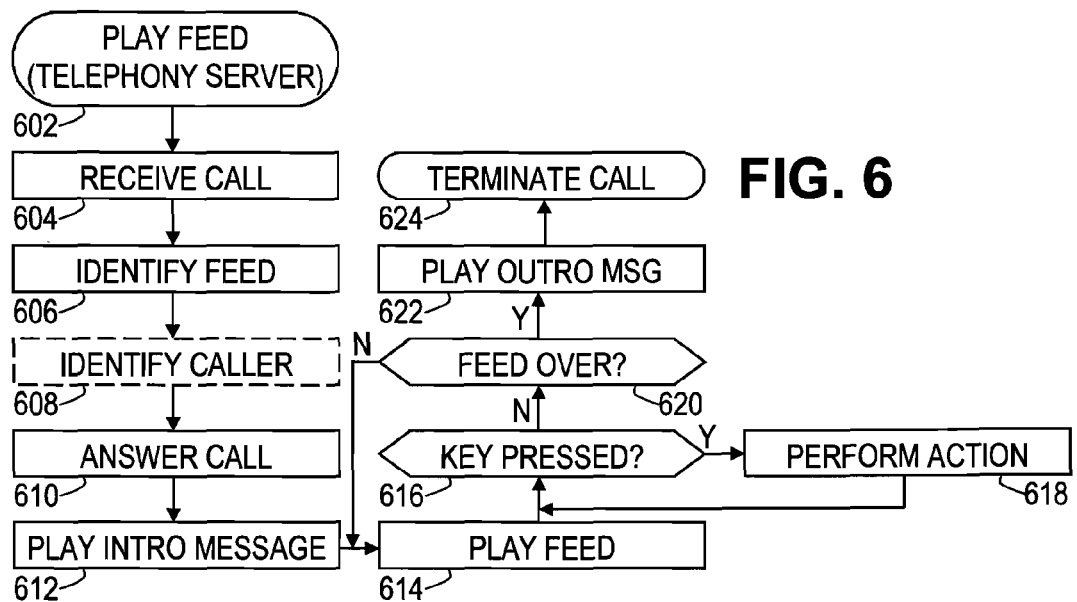
FIG. 6 is a flowchart of an illustrative phonecast playback method.

FIG. 6 is a flowchart of an illustrative phonecast playback method 602. Beginning in block 604, the telephony server receives a call to a dialed number. In block 606, the telephony server accesses the database to determine which feed or multimedia file is currently associated with that dialed number. In optional block 608, the telephony server collects the CID or ANI information. If collected, this information may be used for statistics generation, targeted advertising, subscription services, notification services, and purchasing services. In block 610, the telephony server answers the call, and in block 612, the telephony server initiates playback of an introductory message 612. In at least some method embodiments, playback pause and skip-forward functionality is suspended during the introductory message. After the introductory message finishes, the telephony server initiates playback of the feed corresponding to the dialed number. In blocks 616 and 618, the telephony server detects user input and performs the corresponding actions. Such user interaction may be allowed to continue until the system determines that the feed is complete (or that the user terminated the connection) in block 620. Once the feed is complete, the telephony server optionally plays a closing message in block 622 and terminates the call in block 624.

Figure 7:
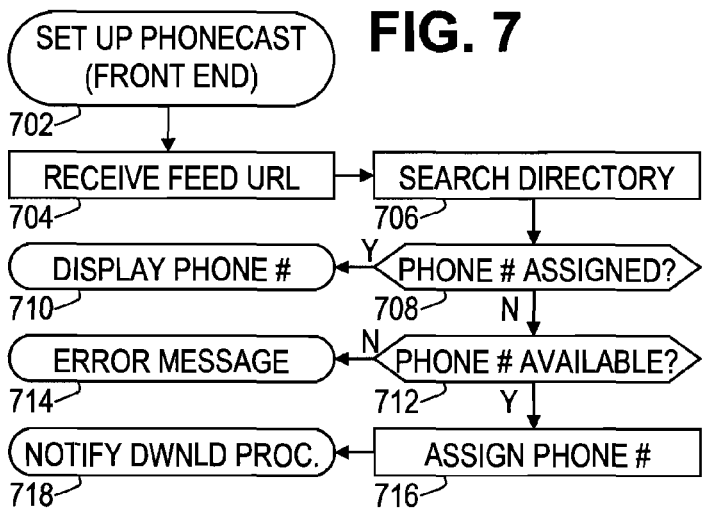
FIG. 7 is a flowchart of an illustrative phonecast setup method.

FIG. 7 is a flowchart of an illustrative Internet-based phonecast setup method 702. Beginning in block 704, the front end server receives a feed identifier such as a URL for a podcast. In block 706, the front end server searches a database or other form of directory to determine if the feed identifier already has a phone number assigned. In block 708, the front end server checks to determine if the search was successful, and if so, the front end provides the phone number for display to the source of feed identifier. If the search was unsuccessful, the front end server determines in block 712 whether any phone numbers are available for it to assign to the feed, and if not, the front end sends an error message in block 714. If a number is available, the front end server assigns the phone number to the feed in block 716 (by updating the database or directory) and notifies the download software that new content needs to be retrieved and prepared for phonecasting.

Note that the method described in FIG. 7 is not limited to web page-based data entry and response. The publicly-accessible front end server may be configured to receive and respond to phone number requests with feed identifiers in a variety of formats, including email, SMS messages, XML files, and other communication methods.

Figure 8:
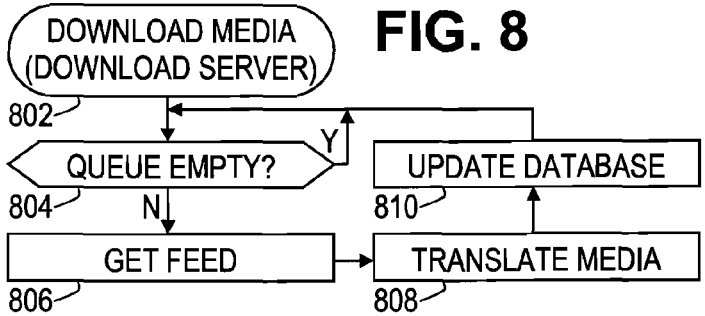
FIG. 8 is a flowchart of an illustrative automated download method.

FIG. 8 is a flowchart of an illustrative automated download method 802 that may be implemented by the download server. Beginning in block 804, the download software determines whether the download queue is empty. The download queue lists files for retrieval by the download software, along with desired destination and a subroutine call to specify success or failure of the retrieval attempt. The download queue may be populated with new feeds by the front end server, and with updated feeds by a crawler component of the download software. In each case, the new or updated content will be associated with a corresponding phone number once the download is complete.

If the download queue is not empty, then in block 806, the download software retrieves the feed. (Although the download software makes provisions for temporary outages and failures, that level of detail is not of crucial importance to this disclosure.) In block 808, the download software translates the feed from its original format to a phonecasting format as described previously. In block 810, the download software notifies the database that the feed is ready for phonecasting.

Figure 9:
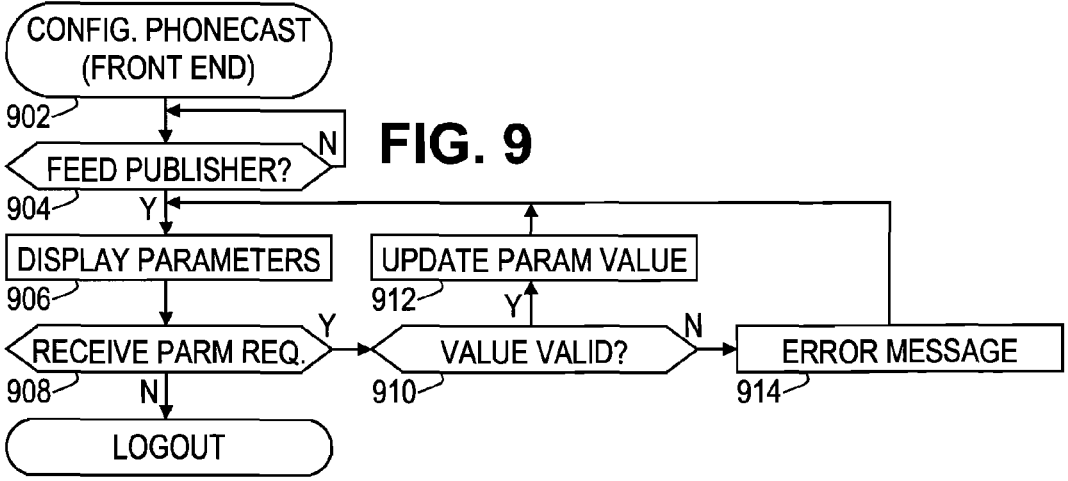
FIG. 9 is a flowchart of an illustrative phonecast parameter configuration method.

FIG. 9 is a flowchart of an illustrative phonecast parameter configuration method 902. Beginning in block 904, the front end determines whether or not it is the feed publisher that is attempting to configure the phonecast. This determination can be performed by having the phonecast publisher log in to an account, or otherwise provide verification that the publisher is who they claim to be. In some cases the publisher may be asked to include a verification code in their syndication file to establish their identity.

In block 906, the front end software displays the current phonecast parameters. In block 908, the front end determines whether the publisher wishes to modify any parameters, and if not, the process terminates. Otherwise, in block 910, the front end determines whether the new parameter value is valid or not. If so, the front end updates the parameter value in block 912. If not, an error message is published in block 914, and the updated parameter values are redisplayed in block 906. Examples of the various parameter values that can be set are provided in the following figure.

Figure 10:
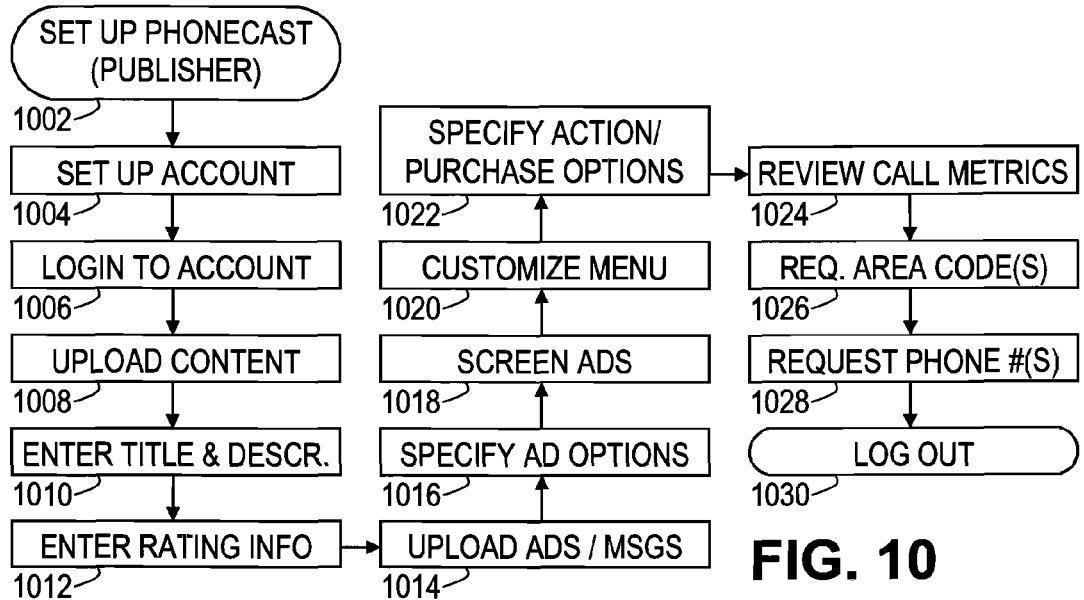
FIG. 10 is a flowchart of an illustrative phonecast setup method for publishers.

FIG. 10 is a flowchart of an illustrative phonecast setup method for publishers 1002. Beginning in block 1004, the publisher sets up an account in the podcasting system. The account setup process provides some mechanism for assuring that the person setting up the account is indeed the publisher or somebody operating on the publisher's behalf. In block 1006, the publisher logs into his account. In block 1008, the publisher uploads a feed to the podcasting system. This action is optional and may be unnecessary unless the publisher is using the podcasting system as his hosting system. In block 1010, the publisher enters a title and description for the feed, and in block 1012, the publisher enters rating information. Again, these actions are optional and may be unnecessary if the feed is syndicated on the Internet, in which case the podcasting system can retrieve this information automatically.

In block 1014, the publisher has the option to upload introductory messages and/or advertisements for use with his podcast. In some method embodiments, the publisher may be expected to pay for this option. In block 1016, the publisher can specify options for the messages or advertisements, including desired budget, desired presentation frequency, desired targeting parameters (e.g. CID area codes), calendar schedules for different ads, limitations on $3^{rd}$ party advertisements (e.g., no automotive ads, or no competitor ads), and so on. In block 1018, the publisher may be presented with the ads he has uploaded and any $3^{rd}$ party ads that qualify under the options he has set, as part of a screening process. The publisher may be permitted to reject ads or affirmatively select or express preferences regarding the screened ads.

In block 1020, the publisher may customize menu options for the podcast listener, including custom voice menus for listeners that provide user inputs requesting standard actions (pause, skip, notification subscription, listen to previous episode, etc). In block 1022, the publisher can specify unique actions or purchase options that are triggered by the appropriate user inputs. For example, certain keys might be designated as voting keys for users to participate in surveys, or a key may be provided to request more information about the current topic, etc. Publishers may be given access to a set of customizable action modules that will be triggered by the appropriate key press or voice input.

Continuing with the present setup example, in block 1024, the publisher may review call metrics, i.e., statistics about the numbers, frequencies, distributions, and lengths of calls to the podcast. Based in part on such statistics, the publisher may request numbers in specific area codes in block 1026, or even request a specific vanity number in block 1028. It should be noted that the sequence of actions described here is illustrative and can be readily re-arranged with certain actions added or omitted per the immediate needs of the publisher. Once finished with the setup process, the publisher logs out in block 1030.

Figure 11:
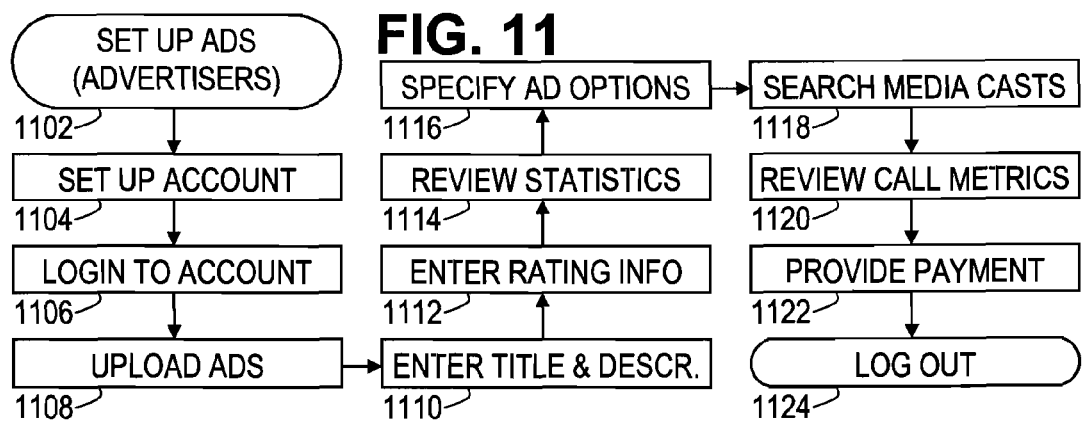
FIG. 11 is a flowchart of an illustrative ad setup method for advertisers.

FIG. 11 is a flowchart of an illustrative ad setup method 1102 for advertisers. Beginning in block 1104, the advertiser sets up an account. This action only needs to be performed once per advertiser. In block 1106, the advertiser logs in to his account and uploads advertisements in block 1108. In block 1110, the advertiser enters titles and short descriptions of the advertisements, and further provides rating information in block 1112. In block 1114, the advertisers can review the statistics for their advertisements, such as number of times presented, frequency on each podcast, average frequency to each CID, advertising costs, and so on. In block 1116, the advertisers can specify their advertising options including calendar limitations, podcast rating limitations, maximum number of ad showings, and so on. In block 1118, the advertisers may search or screen a list of podcasts to specify preferences or prohibitions for advertising on certain podcasts. In block 1120, the advertisers may also review the call statistics for selected podcasts to verify that the have sufficient call volume and coverage of the desired markets (e.g., area codes or other CID/ANI data that may be indicative of geographic or demographic markets). In block 1122, the advertisers can provide payment information and/or bids for their desired advertising parameters. As before, the sequence of actions described here is illustrative and can be readily re-arranged with certain actions added or omitted per the immediate needs of the advertiser. Once finished with the setup process, the advertiser logs out in block 1124.

Figure 12:
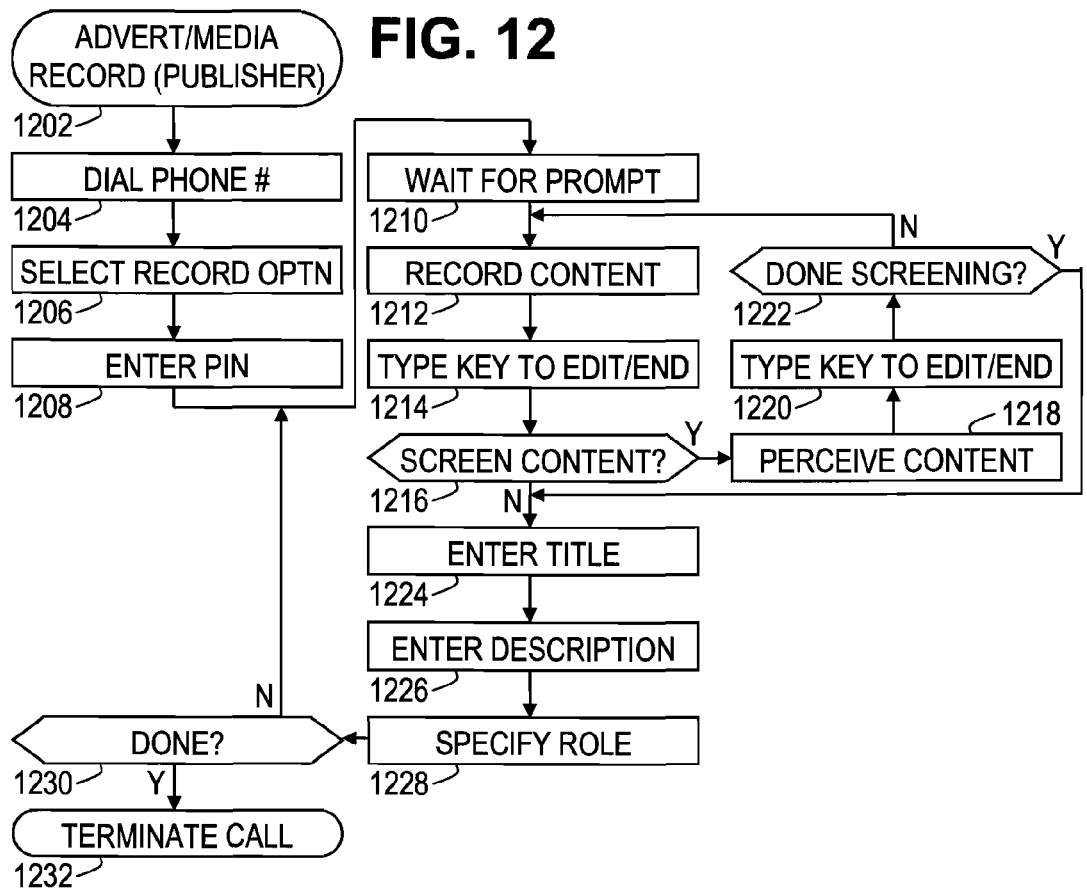
FIG. 12 is a flowchart of an illustrative phonecast recording method.

FIG. 12 is a flowchart of an illustrative phonecast recording method 1202 that may be used as an alternative to uploading a feed via the Internet. Beginning in block 1204, the publisher dials the phone number assigned to his phonecast. In block 1206, the publisher presses a key that triggers a recording option, and in block 1208 enters a personal identification number (PIN) in response to a voice prompt. If the PIN is accepted, the publisher hears a voice prompt in block 1210 to "start recording". In block 1212, the publisher speaks or otherwise provides a sound stream over the phone connection as the phonecasting system records it. When finished, the publisher types a key to stop the recording process in block 1214. In block 1216, the publisher is given the option to review the recording, and if he chooses that option, the recording is played back in block 1218, with the publisher allowed to pause, skip forward, and skip backward. In block 1220, the publisher presses a key to designate an edit point. The edit point may be used to mark an insertion point or to demarcate a deletion/replacement portion of the recording. Alternatively, a key may be pressed to terminate the screening process in block 1222. For insertions or replacements, the publisher does additional recording beginning with block 1212.

Once the screening/editing process is completed, the publisher enters a title in block 1224 and a description in block 1226. The preferred format for the title and description is text, and accordingly, the title and description entry may be performed using any standard keypad-entry technique such as "triple-tap", with or without predictive word completion, and "single-tap" word recognition. Alternatively, voice-to-text technology may be employed. In block 1228, the publisher selects the role of the recorded content, i.e., whether the recorded content is the main feed, or whether it is an advertising message. In block 1230, the publisher is given the option to perform further content recording, and if he declines, the call is terminated in block 1232.

Figure 13:
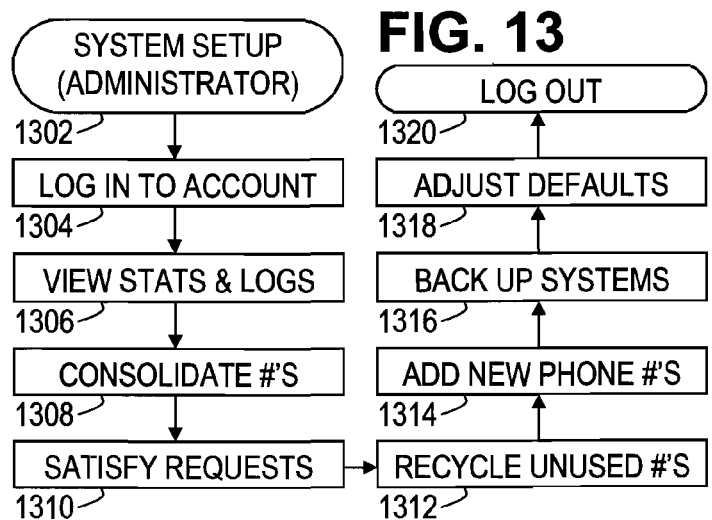
FIG. 13 is a flowchart of an illustrative phonecast system setup method for administrators.

FIG. 13 is a flowchart of an illustrative phonecast system setup method for administrators 1302. Beginning with block 1304, the administrator logs into his account. In block 1306, the administrator reviews the logs and performance statistics of the phonecasting system for any sign of problems, such as available capacity, congestion, adequate resources (including unassigned phone numbers). In block 1308, the administrator reviews feed identifiers identified by a consolidation process as being suspiciously similar or redundant. If the administrator identifies the feeds as being the same, the administrator consolidates them, so that all the associated phone numbers will refer to the same feed. If the resulting group of phone numbers is excessive, the lesser-used phone numbers may be designated for a "phase out", i.e., a message referring callers to one of the remaining phone numbers for that feed.

In block 1310, the administrator reviews manual configuration requests. Primarily, these requests are expected to be multiple phone numbers for a given feed (e.g., one phone number in each area code for a national or regional program), and requests for a specific "vanity" number for a given feed. To the extent that the software doesn't handle such requests automatically, the administrator may manually make the necessary changes to the database to satisfy those requests that can be feasibly satisfied.

In block 1312, the administrator recycles phone numbers that have been assigned to feeds but are relatively unused (e.g., no calls in the last 60 days). This action may be unnecessary so long as an adequate pool of numbers remains available. Conversely, if this action is insufficient, the administrator may add a new block of phone numbers to the pool in block 1314. In block 1316, the administrator initiates a backup of the and database and current configurations of the software. In block 1318, the administrator adjusts the defaults if needed. Such defaults may include thresholds for number recycling, crawling frequencies to check for updates, archived episode age limits, and so on. The sequence of actions described here is illustrative and can be readily rearranged with certain actions added or omitted per the immediate needs of the administrator. Once finished, the advertiser logs out in block 1320.

Figure 14:
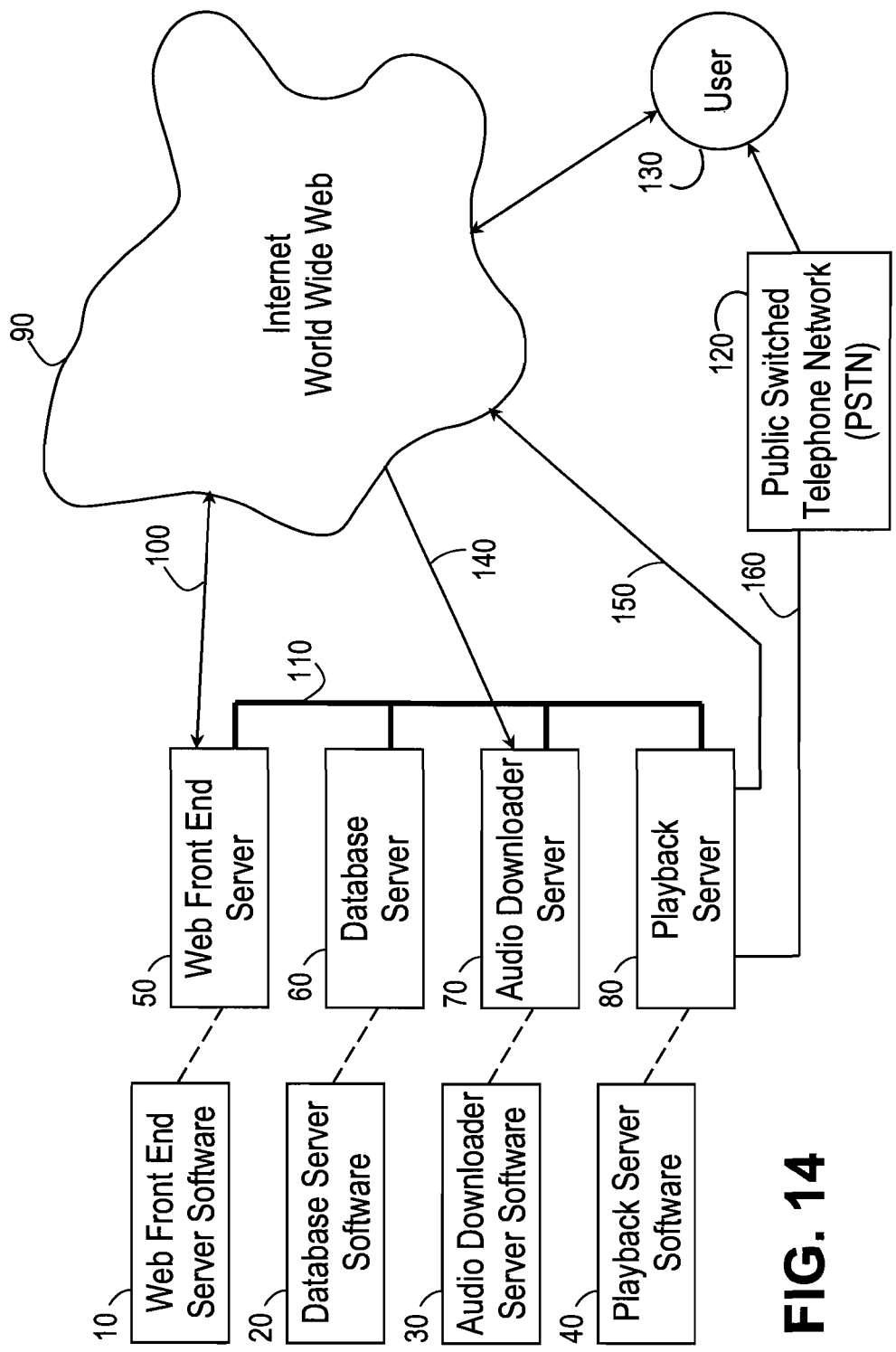
FIG. 14 is a simplified environmental view of an illustrative phonecasting system.

FIG. 14 is a simplified environmental view of an illustrative phonecasting system that supports a method of allowing telephone callers to hear multimedia files syndicated on or otherwise distributed via the Internet. In FIG. 14,

10 is web front end server software.
20 is database server software.
30 is audio downloader server software.
40 is playback server software.
50 is a web front end server.
60 is a database server.
70 is an audio downloader server.
80 is a playback server.
90 is the Internet world wide web.
100 is a web connection.
110 is an inter-server network
120 is a Public Switched Telephone Network (PSTN).
130 is a user.
140 is an RSS and audio download connection.
150 is an optional VoIP trunk.
160 is a telephone network trunk.

The system is comprised of the following components:

A computer attached to the Internet and running software called the "web front end" accepts requests for audio programs that a user or listener wishes to be associated with a telephone number.

A computer running database software called the "database server" stores the mapping between audio programming links and phone numbers.

A computer attached to the Internet running software called the "audio downloader" downloads metadata information about the audio programming, downloads the multimedia files comprising the audio programming, translates that into a format that may be played on a telephone network, and stores that translated data.

A computer called the "playback server" is attached either directly or indirectly to the telephone network, receives calls, and plays audio to the listening caller.

The "web front end" accepts requests for audio programs that a user or listener wishes to be associated with a telephone number.

The "database server" is consulting to determine if an association already exists. If so, the associated phone number is provided to the user or listener, otherwise a new association is created and stored in the "database server" and provided to the user or listener.

The above association might be created by the original publisher of the audio programming instead of by a listener.

The above association might also be used to create an index which may be browsed by users or listeners on the "web front end".

An "audio downloader" uses the above database and downloads the metadata information and the multimedia files containing the audio programming either ahead of time or simultaneously ("streaming") with the listener call, converts these files to a format compatible with the telephone network, and stores these files for future or near-simultaneous playback.

The "audio downloader" also periodically updates the downloaded content with the latest version or episode of the programming. Upon downloading new content, the "audio downloader" might send a notification (e.g., via electronic mail or SMS message) that new programming is available.

The "playback server" receives calls from the telephone network along with dialed number information and, based upon the dialed number, looks up the associated audio program using the "database server", then retrieves the associated audio programming from the "audio downloader" and plays the audio program through the telephone connection.

The "playback server" might be directly attached to the telephone network through a switched or dedicated telephone line or trunk. The "playback server" might be indirectly attached to the telephone network through a Voice over Internet Protocol (VoIP) connection.

The "playback server" might use other information provided during call setup (e.g. calling party identification or carrier identification) in order to determine how to route the call or which audio program to play.

The "playback server" might use information entered on the telephone keypad in order to determine which audio program to play.

The "playback server" might allow for control of the audio program (e.g., pause, rewind, fast-forward) via the telephone keypad.

The "playback server" might allow for a listener to record a message in response to a particular audio program which is delivered back to the publisher or producer of the audio program.

The "playback server" might allow for other informational messages or advertising or sponsorship messages to be played before, during, or after the playing of the audio program.

The servers described above might be combined into a single computer or distributed across many computers, either within a single site or across the Internet.

In one aspect, the proposed scope of protection encompasses a method for allowing telephone callers to hear multimedia files syndicated on or otherwise distributed via the Internet. Users request that certain audio programming be made available by phone by entering information about the programming on a web site. The web site provides the user with the corresponding phone number, allocated from a block of available phone numbers.

In a second aspect, the proposed scope of protection encompasses a system that manages the automatic downloading of the latest audio programming per the user requests. Incoming phone calls are received on trunks. A database translates between the dialed phone numbers and the desired audio programming. The desired audio programming is played to the caller.

In summary, a number of novel phonecasting system and method embodiments have been disclosed. Numerous variations and modifications will become apparent to those skilled in the art once the above disclosure is fully appreciated. It is intended that the following claims be interpreted to embrace all such variations and modifications.

As one example, some of the foregoing systems and methods present advertisements before each feed. It is recognized that other ad placements are feasible, e.g., after certain fixed or programmable intervals of listening, or in some predetermined relationship to inaudible tones or markers inserted in the original feed. To prevent ad skipping, the telephony server software may only permit skipping to within some predetermined distance of the designated ad insertion points.

As another example, the illustrative methods shown in the figures present actions in a sequential series. Those skilled in the programming arts are aware of various parallel and distributed programming methods that can achieve similar results while permitting similar actions to be taken out of sequence, concurrently, or simply as needed. Moreover, the sequences shows are given for illustrative purposes, and in practice many of the actions would be re-ordered, omitted, inserted, or repeated as desired.

As yet another example, the telephony software can be readily extended to buffer, translate, and play live audio streams publicly available on the Internet. For such feeds, some or all of the download server operations may be omitted.

A number of applications of the disclosed methods should be readily apparent. Phonecasts can be used as a type of audible directory, with service and product providers providing descriptions of their services or goods and inviting the listener to press a key for further information, to connect to a live consultant, or to initiate a purchase. Products ranging from real estate to books can include phone numbers that connect a caller to a current, audible program about the property, product, or body of work by the author, thereby building consumer confidence and thereby facilitating the transaction. Artists can have phone numbers assigned to their latest songs or albums so that the public can sample their work and "press 5 to have this music delivered". The disclosed systems and methods may enable a new economy by facilitating the distribution and use of dedicated phone numbers for such purposes.

What is claimed is:

1. A network server that comprises:
   a memory that stores front end software; and
   a processor coupled to the memory to execute the software,
   wherein the software configures the processor to receive an identifier of a feed having an audible component, and further configures the processor to responsively provide at least one preassigned, recently-unused phone number that is thereafter persistently associated with and that provides persistent access to at least the audible component of said feed; and
   wherein the processor further receives a requested area code before responsively providing said at least one phone number,
   wherein the software configures the processor to retrieve said phone number from a database, remove redundant numbers to a given feed, and configures the processor to assign a new different phone number to said feed if a database fails to return at least one phone number for said feed,
   wherein the software establishes a connection to a feed list database, and periodically retrieves a list of feeds from the feed list database to check for updates.

2. The server of claim 1, wherein said feed is a stream publicly available on the Internet.

3. The server of claim 1, wherein said feed is a podcast.

4. The server of claim 3, wherein said identifier is a feed uniform resource locator (URL) for the podcast.

5. The server of claim 1, wherein said feed is a sound file that occasionally changes.

6. The server of claim 1, wherein said feed is a song.

7. The server of claim 1, wherein the feed also has a visual component.

8. The server of claim 1, wherein the processor provides the phone number for display to a user as part of a web page.

9. The server of claim 1, wherein the processor provides the phone number for display to a user as part of an email of other form of text message.

10. The server of claim 1, wherein the processor further receives a proposed phone number before responsively providing said at least one phone number.

11. A method for facilitating listening to audible feeds, the method comprising:
   providing a publicly-accessible web page having a field to accept and record an identifier that is persistently associated with a feed having an audible component;
   receiving the identifier and responsively providing a web page that displays at least one recently unused phone number that is also persistently associated with and provides access to at least the audible component of said feed, the identifier and the at least one phone number being associated with the feed for the duration of the feed's existence;
   establishing a connection to a database, and periodically retrieving a list of feeds to check for updates;
   removing redundant numbers to a given feed,
   assigning a new different phone number to said feed if it is determined that there is no phone number assigned,
   wherein the publicly-accessible web page includes a field to accept a requested area code for said phone number.

12. The method of claim 11, wherein said responsively providing includes assigning said phone number from a set of available phone numbers.

13. The method of claim 11, wherein said feed is a live stream publicly available on the Internet.

14. The method of claim 11, where said feed is a podcast.

15. The method of claim 14, wherein said identifier is a feed URL for the podcast.

16. The method of claim 11, wherein said feed is a sound file that occasionally changes.

17. The method of claim 11, wherein the feed also has a visual component.

* * * * *